US012567806B2

(12) United States Patent
Kudari et al.

(10) Patent No.: US 12,567,806 B2
(45) Date of Patent: Mar. 3, 2026

(54) CONFIGURABLE POWER CONVERSION TOPOLOGY

(71) Applicant: QUALCOMM Incorporated, San Diego, CA (US)

(72) Inventors: Anand Devendra Kudari, Bangalore (IN); Arvindh Rajasekaran, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 265 days.

(21) Appl. No.: 18/537,090

(22) Filed: Dec. 12, 2023

(65) Prior Publication Data

US 2025/0192676 A1    Jun. 12, 2025

(51) Int. Cl.
*H02M 3/158* (2006.01)

(52) U.S. Cl.
CPC .................................... *H02M 3/158* (2013.01)

(58) Field of Classification Search
CPC ...................................................... H02M 3/158
See application file for complete search history.

(56) References Cited

U.S. PATENT DOCUMENTS 9,450,492 B1 * 9/2016 Bizjak ...................... H02M 1/36
2009/0039711 A1 2/2009 Williams

| | | | | |
|---|---|---|---|---|
| 2016/0373073 A1 * | 12/2016 | Kato | ...................... | H03F 3/2173 |
| 2018/0348833 A1 | 12/2018 | Beeston et al. | | |
| 2020/0266766 A1 * | 8/2020 | Khlat | ...................... | H03F 3/245 |
| 2021/0067035 A1 | 3/2021 | Guo et al. | | |
| 2021/0075318 A1 | 3/2021 | Lee et al. | | |
| 2021/0126994 A1 | 4/2021 | Park et al. | | |
| 2021/0320590 A1 | 10/2021 | Ng et al. | | |
| 2022/0311339 A1 * | 9/2022 | Yen | ...................... | H02M 3/158 |
| 2023/0336078 A1 * | 10/2023 | Bertolini | ................ | H02M 3/07 |

OTHER PUBLICATIONS

International Search Report and Written Opinion—PCT/US2024/053422—ISA/EPO—Jan. 23, 2025.

* cited by examiner

*Primary Examiner* — Rafael O De Leon Domenech
(74) *Attorney, Agent, or Firm* — Patterson & Sheridan LLP

(57)    ABSTRACT

Certain aspects of the present disclosure are directed towards a power supply circuit. The power supply circuit generally includes: a first high-side (HS) switch; a first low-side (LS) switch; a second HS switch; a second LS switch; a control circuit having control ports coupled to control inputs of the first HS switch, the first LS switch, the second HS switch, and the second LS switch; and a first multiplexer having a first input coupled to a first feedback node of the power supply circuit and a second input coupled to a second feedback node of the power supply circuit, wherein an output of the first multiplexer is coupled to a first feedback port of the control circuit. Based on multiplexer selection, the power supply circuit can be configured as buck or boost (BoB) circuit or two separate buck circuits by controlling power stages through respective control circuits.

26 Claims, 8 Drawing Sheets

300

800

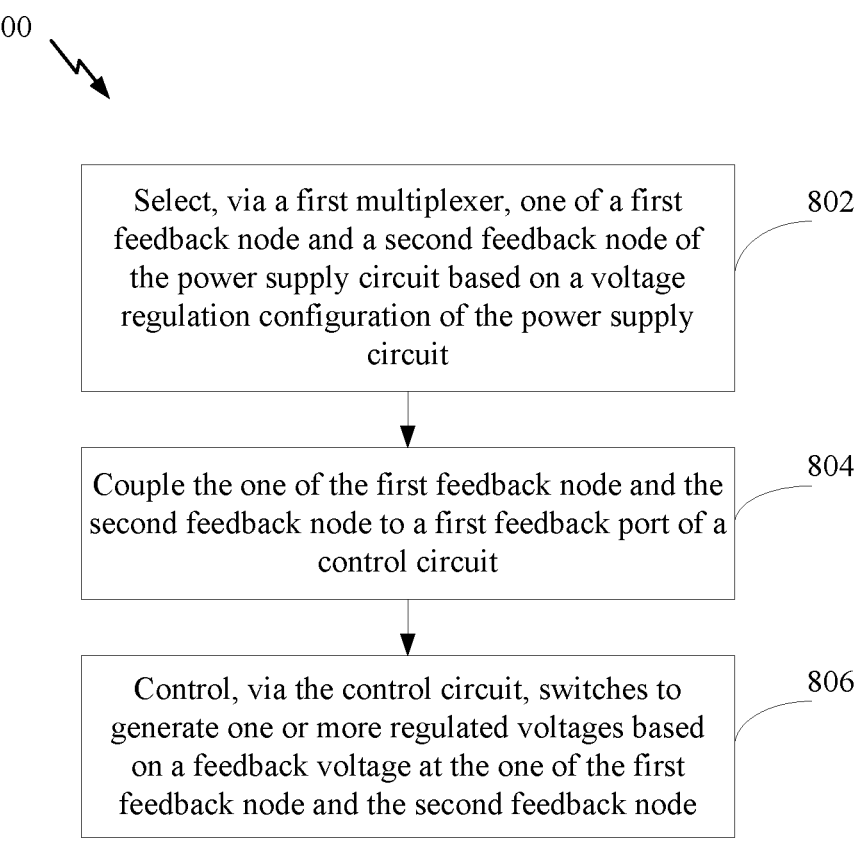

Select, via a first multiplexer, one of a first feedback node and a second feedback node of the power supply circuit based on a voltage regulation configuration of the power supply circuit      802

Couple the one of the first feedback node and the second feedback node to a first feedback port of a control circuit      804

Control, via the control circuit, switches to generate one or more regulated voltages based on a feedback voltage at the one of the first feedback node and the second feedback node      806

FIG. 8

CONFIGURABLE POWER CONVERSION TOPOLOGY

TECHNICAL FIELD

Certain aspects of the present disclosure generally relate to electronic circuits and, more particularly, to a power supply circuit configurable in a buck or boost (BoB) configuration or a dual-buck configuration.

BACKGROUND

A voltage regulator may provide a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator (also known as a "switching converter" or "switcher") may be implemented, for example, by a switched-mode power supply (SMPS), such as a buck converter, a boost converter, a buck-boost converter, or a charge pump.

For example, a buck converter is a type of SMPS that may include: (1) a high-side switch coupled between a relatively higher voltage rail and a switching node, (2) a low-side switch coupled between the switching node and a relatively lower voltage rail, (3) and an inductor coupled between the switching node and a load. The high-side and low-side switches are typically implemented with transistors, although the low-side switch may alternatively be implemented with a diode.

Power management integrated circuits (power management ICs or PMICs) are used for managing the power scheme of a host system and may include and/or control one or more voltage regulators (e.g., buck converters and/or LDOs). A PMIC may be used in battery-operated devices, such as mobile phones, tablets, laptops, wearables, etc., to control the flow and direction of electrical power in the devices. The PMIC may perform a variety of functions for the device, such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure are directed towards a power supply circuit. The power supply circuit generally includes: a first high-side (HS) switch; a first low-side (LS) switch; a second HS switch; a second LS switch; a control circuit having control ports coupled to control inputs of the first HS switch, the first LS switch, the second HS switch, and the second LS switch; and a first multiplexer having a first input coupled to a first feedback node of the power supply circuit and a second input coupled to a second feedback node of the power supply circuit, wherein an output of the first multiplexer is coupled to a first feedback port of the control circuit.

Certain aspects of the present disclosure are directed towards a power supply circuit. The power supply circuit generally includes a first HS switch, a first LS switch, a second HS switch, a second LS switch, and a control circuit coupled to control inputs of the first HS switch, the first LS switch, the second HS switch, and the second LS switch. When the power supply circuit is configured as a dual-buck converter, the control circuit is configured to control the first HS switch and the first LS switch to generate a first buck voltage and control the second HS switch and the second LS switch to generate a second buck voltage. When the power supply circuit is configured as a buck or boost (BoB) converter, the control circuit is configured to control the first HS switch, the first LS switch, the second HS switch, and the second LS switch to generate a BoB voltage.

Certain aspects of the present disclosure are directed towards a method for voltage regulation via a power supply circuit. The method generally includes: selecting, via a first multiplexer, one of a first feedback node and a second feedback node of the power supply circuit based on a voltage regulation configuration of the power supply circuit; coupling the one of the first feedback node and the second feedback node to a first feedback port of a control circuit; and controlling, via the control circuit, switches to generate one or more regulated voltages based on a feedback voltage at the one of the first feedback node and the second feedback node.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

3

Figure 5:
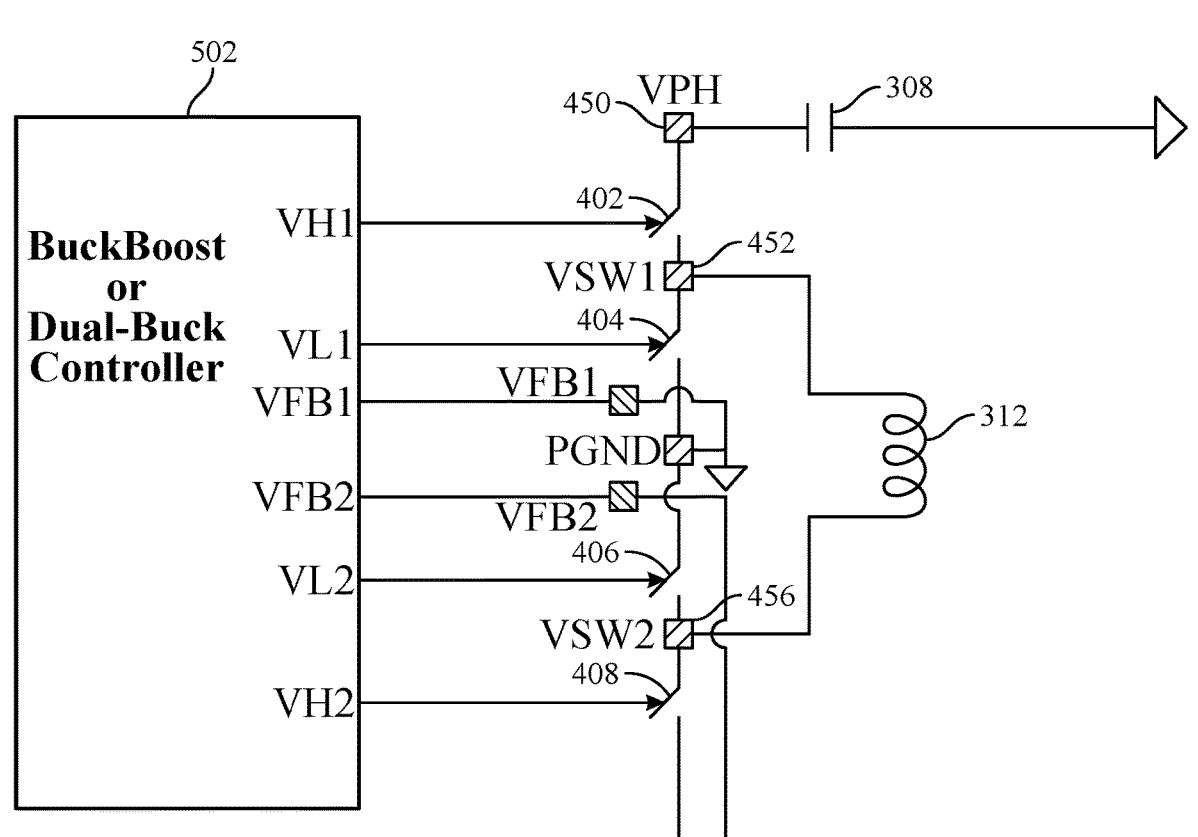

FIG. 5 illustrates a PMIC in a BoB configuration, in accordance with certain aspects of the present disclosure.

Figure 6:
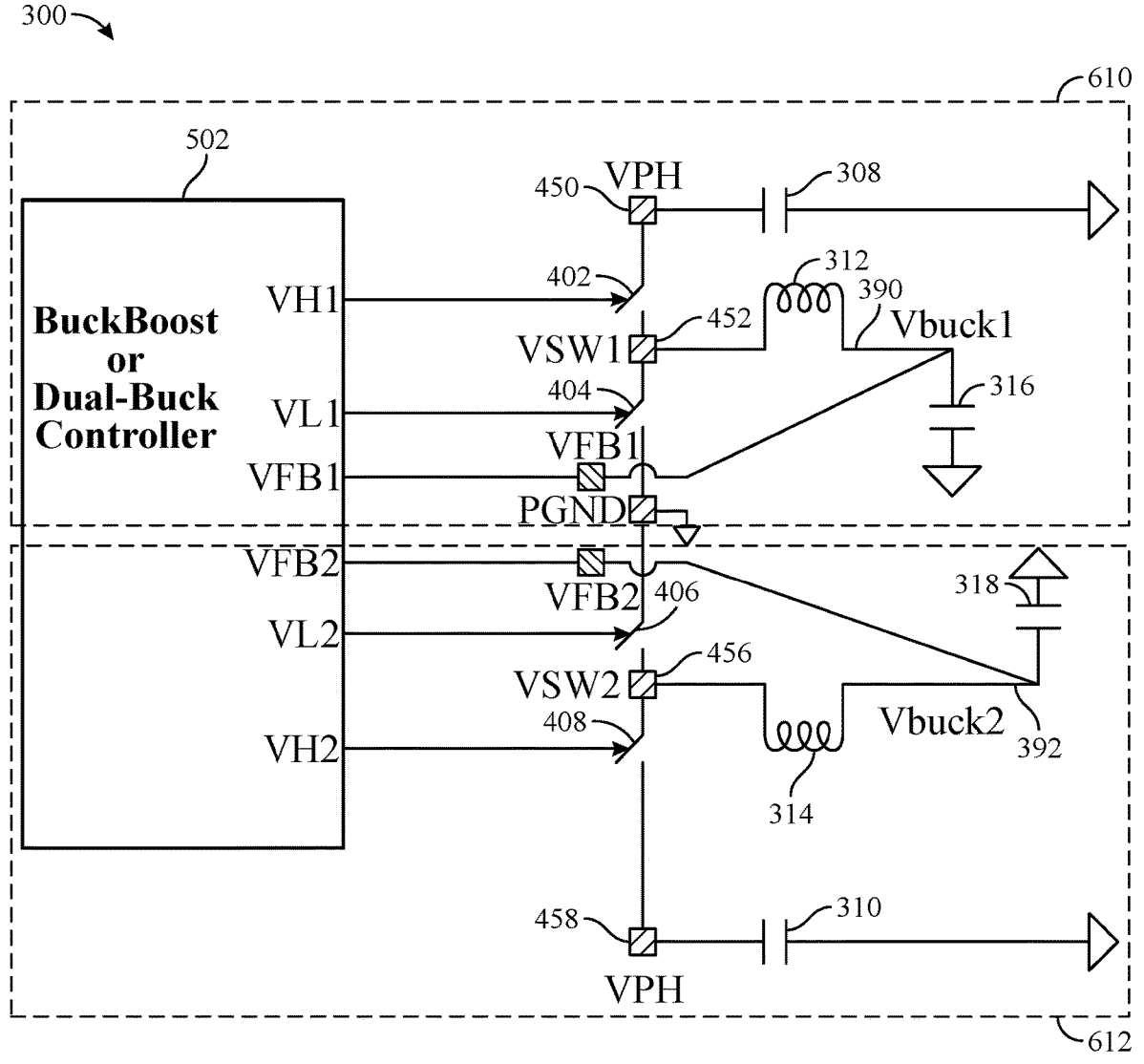

FIG. 6 illustrates a PMIC in a dual-buck configuration, in accordance with certain aspects of the present disclosure.

Figure 7:
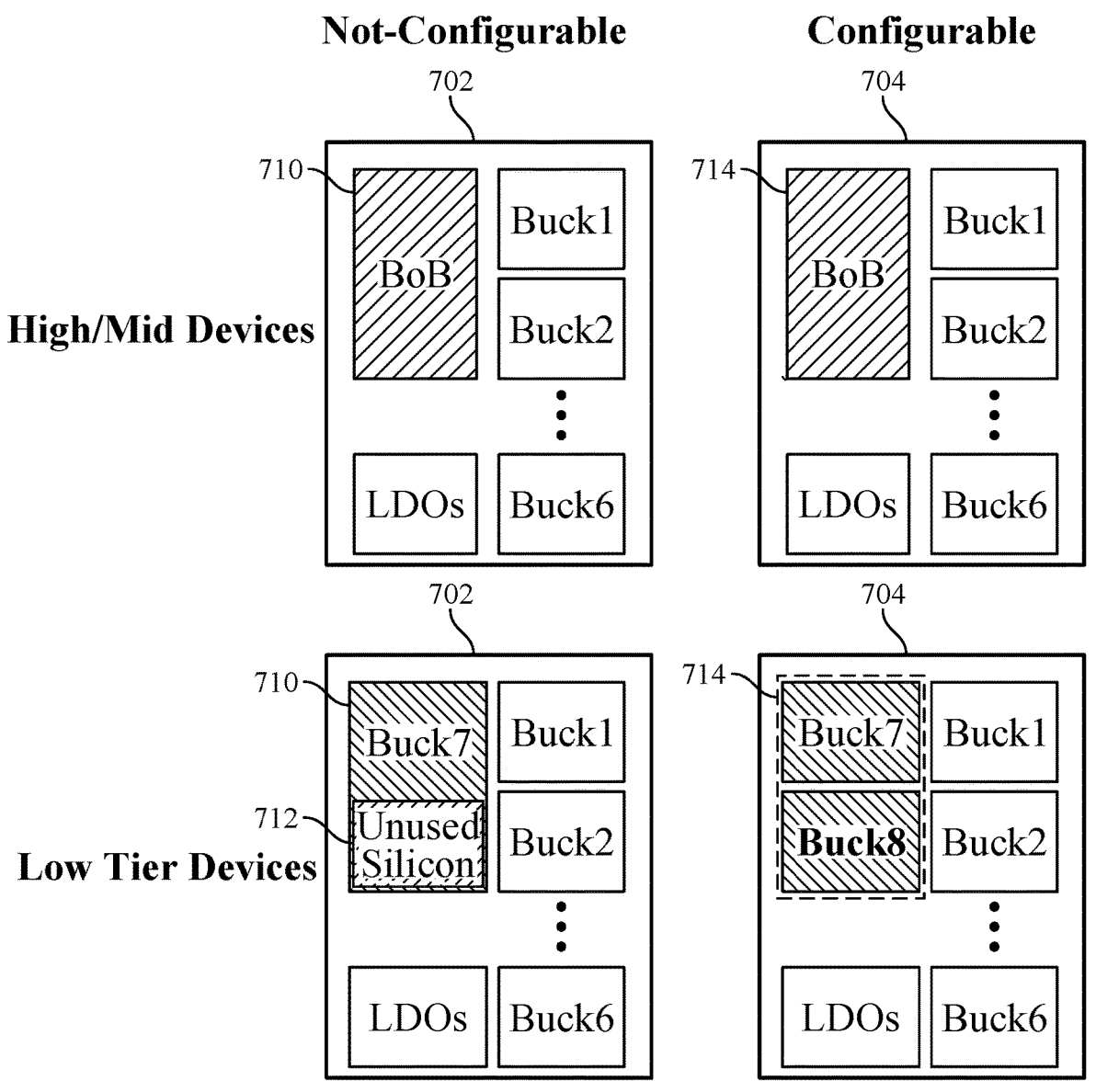

FIG. 7 illustrates configurable and non-configurable power supply circuits, in accordance with certain aspects of the present disclosure.

FIG. 8 is a flow diagram illustrating example operations for supplying power, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Certain aspects of the present disclosure are directed towards a power management integrated circuit (PMIC) having a power supply circuit that is configurable as either a buck or boost (BoB) converter or a dual-buck converter. The power supply circuit may be implemented with power stages including four switches to implement the BoB converter. The power supply circuit may be configured as a dual-buck converter, where two of the four switches are used to implement a first buck converter and another two of the four switches are used to implement a second buck converter. In some aspects, the power supply circuit may include multiplexers to direct control and feedback voltages to appropriate controller ports depending on the power supply circuit configuration, as described in more detail herein. Certain aspects of the present disclosure allow for the same power supply circuit to be used for different applications that benefit from having a BoB converter or benefit from having two buck converters.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connect with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatuses, such as in the power supply, battery charging circuit, or power management circuit of a communication system, a video codec, audio equipment such as music players and microphones, a television, camera equipment, and test equipment such as an oscilloscope.

Figure 1:
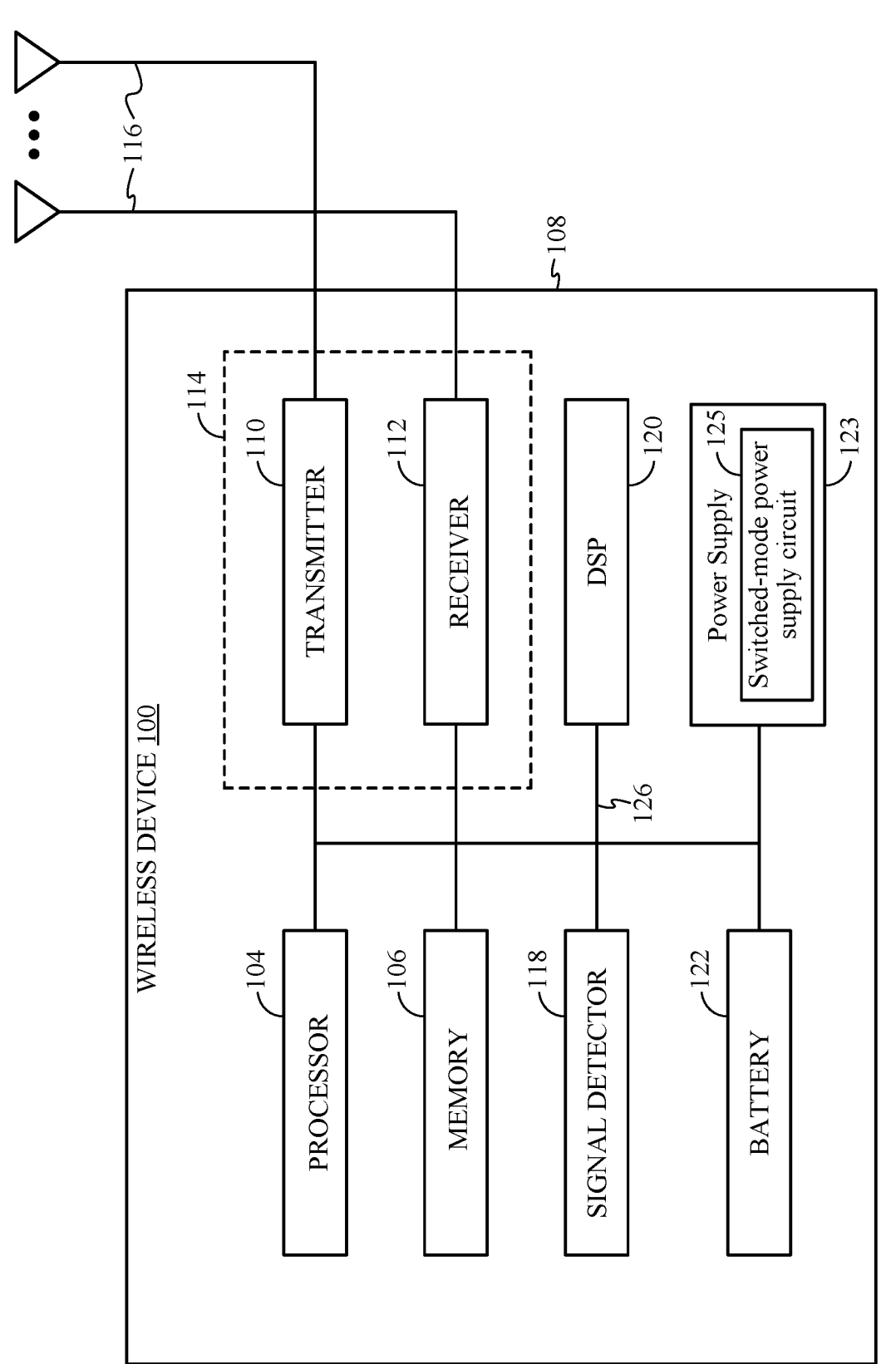
FIG. 1 illustrates a block diagram of an example device that includes a power supply system with at least one switched-mode power supply (SMPS) circuit, in which aspects of the present disclosure may be practiced.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, an Internet of things (IoT) device, a wearable device, a virtual reality (VR) or augmented reality (AR) device, etc.

The device 100 may include a processor 104 that controls operation of the device 100. The processor 104 may also be referred to as a central processing unit (CPU). Memory 106 provides instructions and data to the processor 104. The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122, which may be used to power the various components of the device 100 (e.g., when the device is disconnected from an external power source). The device 100 may also include a power supply system 123 for managing the power from the battery (or from one or more power ports for receiving external power) to the various components of the device 100. At least a portion of the power supply system 123 may be implemented in one or more power management integrated circuits (power management ICs or PMICs) The power supply system 123 may perform a variety of functions for the device 100 such as DC-to-DC conversion, battery charging, power-source selection, voltage scaling, power sequencing, etc. For example, the power supply system 123 may include one or more power supply circuits, which may include a switched-mode power supply circuit 125. The switched-mode power supply circuit 125 may be implemented by any of various suitable switched-mode power supply circuit topologies, such as a three-level buck converter, a divide-by-two (Div2) charge pump, or an adaptive combination power supply circuit, which can switch between operating in a three-level buck converter mode and a two-level buck converter mode. In some aspects, the switched-mode power supply circuit 125 may be configurable as either a buck or boost (BoB) converter or a dual-buck converter, as described in more detail herein.

The various components of the device 100 may be coupled together by a bus system 126, which may include a power bus, a control signal bus, and/or a status signal bus in addition to a data bus. Additionally or alternatively, various combinations of the components of the device 100 may be coupled together by one or more other suitable techniques.

Example Power Supply Scheme

Figure 2:
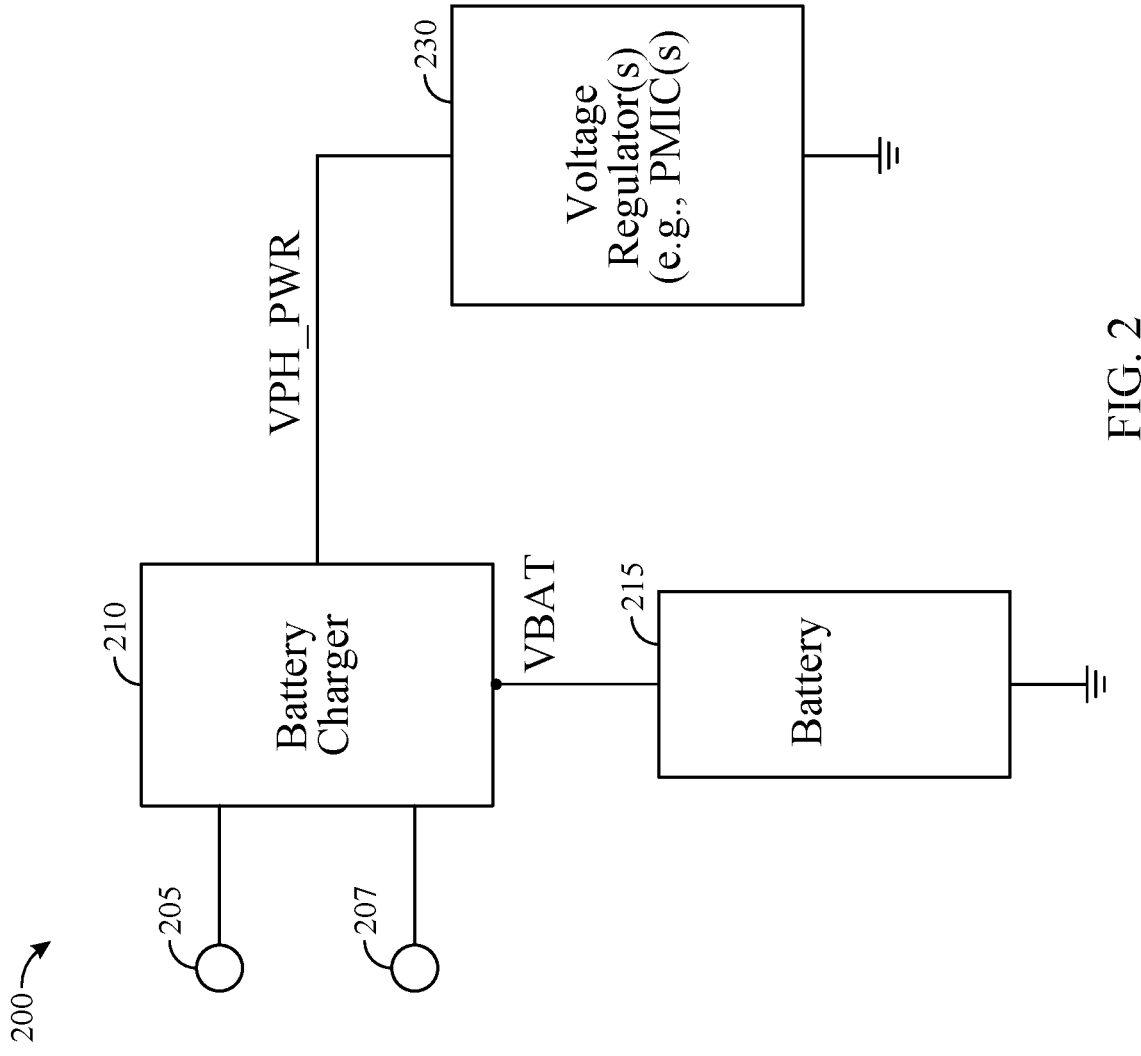
FIG. 2 is a block diagram of an example power supply scheme, in which aspects of the present disclosure may be practiced.

FIG. 2 is a block diagram of an example power supply scheme 200, in which aspects of the present disclosure may be implemented. The power supply scheme 200 includes a battery charging circuit 210, a battery circuit 215, and one or more voltage regulators 230.

The battery charging circuit 210 may receive power from one or more ports (e.g., ports 205 and 207), and this received power may be converted and used to charge a battery or a battery pack in a battery circuit 215 of a portable device (e.g., a smartphone, tablet, and the like). For example, port 205 may be a Universal Serial Bus (USB) port for connecting to a wall adapter, whereas port 207 may be a wireless power port. The battery circuit 215 may also include any protection circuitry, which may include switches implemented by transistors, for example. For certain aspects, the battery charging circuit 210, or at least a portion thereof, may reside in a PMIC in the device. The battery charging circuit 210 may generate an output voltage VPH_PWR provided to the one or more regulators 230. The battery charging circuit 210 may comprise, for example, one or more switched-mode power supplies (e.g., a buck converter and/or a buck or boost (BoB) converter). For certain aspects, the battery charging circuit may comprise two or more parallel charging circuits, each capable of charging the battery, which may be connected together and to the battery in an effort to provide fast charging of the battery. The parallel charging circuits may be configured so that these circuits do not adversely interfere with each other during battery charging (e.g., in a master-slave relationship). Charging circuits for a parallel charger may use buck converter topologies.

The one or more voltage regulators 230 may include one or more linear regulators and/or one or more switching regulators for generating smaller voltages (e.g., 1.2 to 3.3 V) from VPH_PWR. For certain aspects, the voltage regulators 230 may include core PMICs for the device.

Power management integrated circuits (PMICs) are designed to meet certain power, cost, performance and form factor specifications. PMICs may include several voltage regulators of varying types, such as buck converters, boost converters, buck or boost (BoB) converters, and low-drop output (LDO) regulators. Catering to many products while lowering non-recurring engineering (NRE) efforts involves reusing PMICs across chipsets, which in turn decides the combination of regulators in a given PMIC. Analysis of PMIC specifications in a value-tier mobile space shows that the high and middle-tier devices often use a BoB converter and additional regulators while the low and entry-tier devices often do not use a BoB converter. With NRE constraints, if one PMIC is to be used for all value-tier devices, the low and entry-tier devices may pay a carrying cost of the BoB circuit, or a separate part with a BoB converter should be designed and manufactured for the high and middle tiers devices. Both options present a cost trade-off that may not be acceptable for the respective tier. Building two PMIC variants, one with a BoB converter and one without, results in nearly twice the NRE. Alternatively, if a single PMIC is built to save on NRE, it will result in higher unit cost for low-tier devices or additional materials costs for high-tier devices. Certain aspects of the present disclosure are directed towards a PMIC having a power supply circuit with power control circuitry configurable as either a BoB converter or two separate buck converters.

Figure 3A:
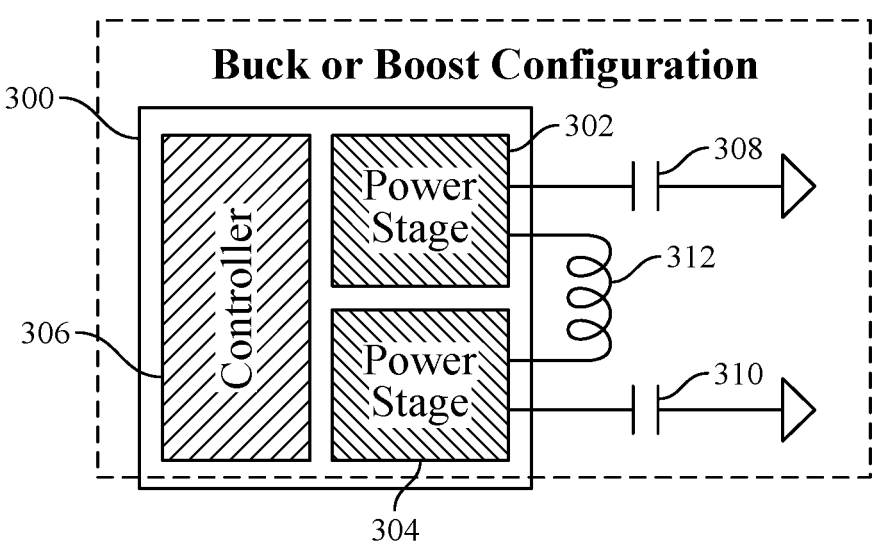
FIG. 3A illustrates a power supply circuit within a power management integrated circuit (PMIC) configured with a buck or boost (BoB) converter, in accordance with certain aspects of the present disclosure.
Figure 3B:
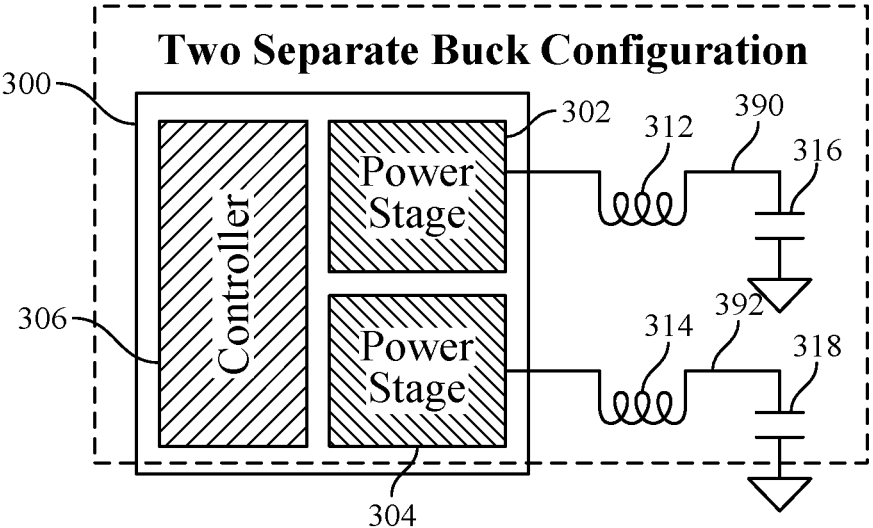
FIG. 3B illustrates a power supply circuit within a PMIC configured with two buck converters, in accordance with certain aspects of the present disclosure.

FIG. 3A illustrates a power supply circuit 300 configured with a BoB converter, and FIG. 3B illustrates the power supply circuit 300 configured with two buck converters, in accordance with certain aspects of the present disclosure. The power supply circuit 300 may be part of a PMIC which may include one or more other converters not shown in FIG. 3A. The power supply circuit 300 may represent an example of the voltage regulators 230 of FIG. 2. A BoB converter refers to a direct-current (DC) to (DC) converter that generates a regulated voltage based on an input voltage and can be used to implement either a buck converter or a boost converter. The BoB converter may be implemented with four switches that are operated to generate a regulated voltage that is greater than or less than the input voltage. On the other hand, a buck converter may be implemented with two switches that are operated to generate a regulated voltage that is less than an input voltage of the buck converter.

As shown, the power supply circuit 300 may include a controller 306 and power stages 302, 304 (e.g., switches for implementing converter operations). As shown in FIG. 3A, to configure the power supply circuit as a BOB converter, an inductive element 312 may be coupled between the power stages 302, 304. Capacitive elements 308, 310 may be coupled between each of the respective power stages 302, 304 and a reference potential node (e.g., electric ground). The controller 306 may control the power stages 302, 304 (e.g., gate drivers and transistors (neither shown) to implement the switches) to operate the power supply circuit in a BOB configuration. As shown in FIG. 3B, to implement two separate buck converters, an inductive element 312, 314 may be coupled between each of the respective power stages 302, 304 and a respective output node 390, 392. Capacitive elements 316, 318 may be coupled between respective output nodes 390, 392 and a reference potential node (e.g., electric ground).

Figure 4:
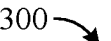
FIG. 4 illustrates a PMIC configurable as a BoB converter or two buck converters using multiplexers, in accordance with certain aspects of the present application.

FIG. 4 illustrates a power supply circuit 300 configurable as a BoB converter or two buck converters using multiplexers, in accordance with certain aspects of the present application. As shown, the power supply circuit 300 may include a BoB controller 420 that may be configured to control a first high-side (HS) switch 402, a first low-side (LS) switch 404, a second LS switch 406, and a second HS switch 408. The power supply circuit 300 may also include a buck controller 422, which may be configured to control the second LS switch 406 and the second HS switch 408. The controller 420 and/or the controller 422 may include (or have outputs coupled to) gate drivers for driving power transistors implementing the various switches 402, 404, 406, 408. The switches are used to deliver power to an inductive element 312 in a BoB configuration. When in the buck configuration (e.g., configured with two separate bucks), the switches are repurposed as two pairs of HS and LS switches. The semiconductor area of a BoB converter is dominated by power stages (e.g., HS and LS switches). The power supply circuit 300 reuses the power stage to implement either a BoB converter or two separate buck converters.

The BoB controller 420 may include a first HS switch voltage (VH1) port coupled to a control input of the HS switch 402 and a first LS switch voltage (VL1) port coupled to a control input of the LS switch 404. The power supply circuit 300 may include a multiplexer 410 having BoB inputs coupled to a second HS switch voltage (VH2) port and a second LS switch voltage (VL2) port of the controller 420. The power supply circuit 300 may also include a buck controller 422 having a HS switch voltage (VH) port and a LS switch voltage (VL) port coupled to buck inputs of the multiplexer 410. The multiplexer 410 may include a set of outputs coupled to respective control inputs of the LS switch 406 and the HS switch 408. The multiplexer 410 may receive a control input (labeled "BoB") to operate the power supply circuit 300 in either BoB or dual-buck configuration. If operating in the BoB configuration, the switches 406, 408 may be controlled via the VL2 and VH2 ports of the BoB controller 420, and if operating in the dual-buck configuration, the switches 406, 408 may be controlled via the VL and VH ports of the buck controller 422. The power supply circuit 300 may also include a multiplexer 418 having a buck input coupled to a first feedback voltage (VFB1) node of the power supply circuit 300 and a BoB input coupled to a second feedback voltage (VFB2) node of the power supply circuit 300. The output of the multiplexer 418 may be coupled to a feedback voltage (VFB) port of the controller 420. As shown, the buck controller 422 also includes a VFB port coupled to the VFB2 node of the power supply circuit 300.

As shown, to operate the power supply circuit with a BoB converter, a first terminal of the inductive element 312 may be coupled to a node 452 (e.g., a first switching voltage (VSW1) node) between switches 402, 404, and a second terminal of the inductive element 312 may be coupled to a node 456 (e.g., a second switching voltage (VSW2) node) between switches 406, 408.

As shown, the capacitive element 308 may be coupled between a node 450 and the reference potential node (e.g., electric ground), and the capacitive element 310 may be coupled between a node 458 and the reference potential node. Moreover, the VFB1 node of the power supply circuit 300 may be coupled to electric ground (e.g., labeled "PGND" for power ground) in the BoB configuration. The VFB2 node of the power supply circuit 300 may be coupled to node 458, which may be used as an output node (e.g., providing a BoB voltage labeled "VBoB") of the power supply circuit 300 in the BoB configuration. The node 450 may be used as an input node (labeled "VPH") of the power supply circuit 300. The multiplexer 418 may be controlled to couple the VFB2 node to the VFB port of controller 420, where the VFB2 node is coupled to the output node 458 as shown to provide a feedback voltage to the controller 420 for voltage regulation. Moreover, the multiplexer 410 may be controlled such that switches 406, 408 are controlled via the VL2 and VH2 ports of the controller 420 in the BoB configuration. Thus, the controller 420 controls switches 402, 404, 406, 408 to generate VBoB at node 458 based on the feedback voltage received at the VFB port of the controller 420 through multiplexer 418.

FIG. 5 illustrates the power supply circuit 300 in a BoB configuration, in accordance with certain aspects of the present disclosure. The controller 502 may include the controllers 420, 422, multiplexer 418, and multiplexer 410 described with respect to FIG. 4. The controller 502 includes a VH1 port configured to control HS switch 402, a VL1 port configured to control LS switch 404, a VH2 port configured to control HS switch 408, and a VL2 port configured to control LS switch 406. Thus, in a BoB configuration, the controller 502 controls switches 402, 404, 406, 408 to generate VBoB at node 458 based on an input voltage at node 450 and the feedback voltage received at the VFB2 port of the controller 502 (e.g., where the VFB2 port is coupled to the output node 458 of the BoB and the VFB1 port is coupled to electric ground).

FIG. 6 illustrates the power supply circuit 300 configured with separate buck converters, in accordance with certain aspects of the present disclosure. As shown, the power supply circuit 300 includes circuitry 610 for a first buck converter and circuitry 612 for a second buck converter. Circuitry 610 for the first buck converter may include capacitive elements 308, 316, HS switch 402, LS switch 404, and inductive element 312, and circuitry for the second buck converter may include capacitive elements 310, 318, HS switch 408, LS switch 406, and inductive element 314. As shown, the VFB1 port of the controller 502 is coupled to the VFB1 node of the power supply circuit 300, and the VFB1 node is coupled to the output node 390 at which a first buck voltage (Vbuck1) is generated. The VFB2 port of the controller 502 may be coupled to the VFB2 node, and the VFB2 node may be coupled to the output node 392 at which a second buck voltage (Vbuck2) is generated. As shown, the node 450 may be used as an input node for the first buck converter, and node 458 may be used as an input node for the second buck converter. In other words, the controller 502 controls switches 402, 404 to generate Vbuck1 based on the input voltage at node 450 and controls switches 406, 408 to generate Vbuck2 based on the input voltage at node 458.

FIG. 7 illustrates configurable and non-configurable power supply circuits, in accordance with certain aspects of the present disclosure. The power supply circuits may include multiple buck converters (e.g., "Buck 1" to "Buck 6") and one or more low dropout (LDO) regulators.

As shown, power supply circuit 702 may not be configurable as a BoB or dual-buck converter. Thus, power supply circuit 710 may be configured as a BoB converter for high-tier and middle-tier devices (e.g., mobile platforms) or as a single-buck converter (e.g., configured as a seventh buck converter labeled "Buck 7") for low-tier devices. However, when in the single-buck configuration, a portion 712 of the silicon (or other semiconductor material) used to implement the power supply circuit 710 may be unused, which may not be acceptable for a cost-sensitive market and/or a space-sensitive application. In contrast, the power supply circuit 704 (e.g., corresponding to the power supply circuit 300) may be in a BoB configuration or in a dual-buck configuration. When in the dual-buck configuration, the power supply circuit 714 implements two buck converters (labeled "Buck 7" and "Buck 8") so that the otherwise unused semiconductor can be used to implement the second buck converter.

FIG. 8 is a flow diagram illustrating example operations 800 for supplying power. The operations 800 may be performed by a power supply circuit, such as a power supply circuit of the power supply circuit 300 of FIG. 3, FIG. 4, or FIG. 5.

At block 802, the power supply circuit selects, via a first multiplexer (e.g., multiplexer 418 of FIG. 4), one of a first feedback node (e.g., VFB1 node of FIG. 4) and a second feedback node (e.g., VFB2 node of FIG. 4) of the power supply circuit based on a voltage regulation configuration of the power supply circuit. At block 804, the power supply circuit couples the one of the first feedback node and the second feedback node to a first feedback port (e.g., VFB port of controller 420) of a control circuit. At block 806, the power supply circuit controls, via the control circuit, switches to generate one or more regulated voltages based on a feedback voltage at the one of the first feedback node and the second feedback node. The switches may be implemented, for example, by power transistors.

In some aspects, the control circuit includes a BoB controller (e.g., controller 420) and a buck controller (e.g., buck controller 422). The power supply circuit may select a first set of inputs of a second multiplexer (e.g., multiplexer 410) or a second set of inputs of the second multiplexer. The first set of inputs is coupled to a first set of the control ports (e.g., VH2 and VL2 ports of controller 420) for the BoB controller. The second set of inputs of the second multiplexer may be coupled to a second set of control ports (e.g., VH and VL ports of controller 422) for the buck controller. The power supply circuit may couple the first set of inputs or the second set of inputs of the second multiplexer to a set of switches (e.g., switches 408, 406) of the power supply circuit, respectively, to generate the one or more regulated voltages. In some aspects, the second feedback node may be coupled to a feedback port of the buck controller.

In some aspects, the switches may include a first HS switch (e.g., switch 402), a first LS switch (e.g., switch 404), a second HS switch (e.g., switch 408), and a second LS switch (e.g., switch 406).

In some aspects, when the voltage regulation configuration is a buck or boost (BoB) configuration, generating the one or more regulated voltages may include directing current across an inductive element (e.g., inductive element 312) having a first terminal coupled to a first switching node (e.g., node 452 of FIG. 4 or FIG. 5) between the first HS switch and the first LS switch and a second terminal coupled to a second switching node (e.g., node 456 of FIG. 4 or FIG. 5) between the second HS switch and the second LS switch. In some aspects, when the power supply circuit is configured as a BoB converter, the first HS switch may be coupled between an input node (e.g., node 450 of FIG. 5) of the BoB converter and the first switching node, and the second HS switch may be coupled between the second switching node and an output node (e.g., node 458) of the BoB converter. The one or more regulated voltages may include a regulated voltage at the output node. In some aspects, when the voltage regulation configuration is the BoB configuration, another one (e.g., the VFB1 node of FIG. 5) of the first feedback node and the second feedback node is coupled to a reference potential node.

In some aspects, when the voltage regulation configuration is a dual-buck configuration, generating the one or more regulated voltages may include directing current across a first inductive element (e.g., inductive element 312 of FIG. 6) having a first terminal coupled to a first switching node (e.g. node 452) between the first HS switch and the first LS switch and a second terminal coupled to a first output node (e.g., node 390) of the power supply circuit. The one or more regulated voltages may include a first regulated voltage at the first output node. Generating the one or more regulated voltages may also include directing current across a second inductive element (e.g., inductive element 314) having a first terminal coupled to a second switching node (e.g., node 456) between the second HS switch and the second LS switch and a second terminal coupled to a second output node (e.g., node 392) of the power supply circuit. The one or more regulated voltages may include a second regulated voltage at the second output node. The first output node may be coupled to the first feedback node, and the second output node may be coupled to the second feedback node.

Example Aspects

Aspect 1: A power supply circuit, comprising: a first high-side (HS) switch; a first low-side (LS) switch; a second HS switch; a second LS switch; a control circuit having control ports coupled to control inputs of the first HS switch, the first LS switch, the second HS switch, and the second LS switch; and a first multiplexer having a first input coupled to a first feedback node of the power supply circuit and a second input coupled to a second feedback node of the power supply circuit, wherein an output of the first multiplexer is coupled to a first feedback port of the control circuit.

Aspect 2: The power supply circuit of Aspect 1, wherein: the control circuit comprises a buck or boost (BoB) controller having a first set of the control ports and a buck controller having a second set of the control ports; and the power supply circuit further comprises a second multiplexer having a first set of inputs coupled to the first set of the control ports, a second set of inputs coupled to the second set of the control ports, and a set of outputs coupled to the control inputs of the second HS switch and the second LS switch.

Aspect 3: The power supply circuit of Aspect 2, wherein the output of the first multiplexer is coupled to the first feedback port of the BoB controller.

Aspect 4: The power supply circuit of Aspect 2 or 3, wherein the second feedback node is coupled to a second feedback port of the buck controller.

Aspect 5: The power supply circuit according to any of Aspects 1-4, further comprising an inductive element having a first terminal coupled to a first switching node between the first HS switch and the first LS switch and a second terminal coupled to a second switching node between the second HS switch and the second LS switch.

Aspect 6: The power supply circuit of Aspect 5, wherein the power supply circuit is configured as a BoB converter, wherein the first HS switch is coupled between an input node of the BoB converter and the first switching node, and wherein the second HS switch is coupled between the second switching node and an output node of the BoB converter.

Aspect 7: The power supply circuit of Aspect 6, wherein the output node is coupled to the second feedback node, and wherein the first feedback node is coupled to a reference potential node.

Aspect 8: The power supply circuit according to any of Aspects 1-7, further comprising: a first inductive element having a first terminal coupled to a first switching node between the first HS switch and the first LS switch, and a second terminal coupled to a first output node of the power supply circuit; and a second inductive element having a first terminal coupled to a second switching node between the second HS switch and the second LS switch, and a second terminal coupled to a second output node of the power supply circuit.

Aspect 9: The power supply circuit of Aspect 8, wherein: the first output node is coupled to the first feedback node; and the second output node is coupled to the second feedback node.

Aspect 10: The power supply circuit of Aspect 8 or 9, wherein the power supply circuit is configured with: a first buck converter having the first inductive element, the first HS switch, and the first LS switch, wherein the first HS switch is coupled between an input node of the first buck converter and the first switching node; and a second buck converter having the second inductive element, the second HS switch, and the second LS switch, wherein the second HS switch is coupled between an input node of the second buck converter and the second switching node.

Aspect 11: A power supply circuit, comprising: a first high-side (HS) switch; a first low-side (LS) switch; a second HS switch; a second LS switch; and a control circuit coupled to control inputs of the first HS switch, the first LS switch, the second HS switch, and the second LS switch, wherein: when the power supply circuit is configured as a dual-buck converter, the control circuit is configured to control the first HS switch and the first LS switch to generate a first buck voltage and control the second HS switch and the second LS switch to generate a second buck voltage; and when the power supply circuit is configured as a buck or boost (BoB) converter, the control circuit is configured to control the first HS switch, the first LS switch, the second HS switch, and the second LS switch to generate a BoB voltage.

Aspect 12: The power supply circuit of Aspect 11, further comprising: a first feedback node coupled to a first feedback port of the control circuit; and a second feedback node coupled to a second feedback port of the control circuit.

Aspect 13: The power supply circuit of Aspect 12, wherein, when the power supply circuit is configured as the dual-buck converter, the first feedback node is coupled to a first output node of the power supply circuit configured to have the first buck voltage and the second feedback node is coupled to a second output node of the power supply circuit configured to have the second buck voltage.

Aspect 14: The power supply circuit of Aspect 12 or 13, wherein, when the power supply circuit is configured as the BoB converter, the first feedback node is coupled to a reference potential node and the second feedback node is coupled to an output node of the power supply circuit configured to have the BoB voltage.

Aspect 15: The power supply circuit according to any of Aspects 11-14, wherein, when the power supply circuit is configured as the dual-buck converter, the power supply circuit further comprises: a first inductive element having a first terminal coupled to a first switching node between the first HS switch and the first LS switch and a second terminal coupled to a first output node of the power supply circuit configured to have the first buck voltage; and a second inductive element having a first terminal coupled to a second switching node between the second HS switch and the second LS switch and a second terminal coupled to a second output node of the power supply circuit configured to have the second buck voltage.

Aspect 16: The power supply circuit of Aspect 15, wherein, when the power supply circuit is configured as the dual-buck converter: the first HS switch is coupled between a first input node of the power supply circuit and the first switching node; and the second HS switch is coupled between a second input node of the power supply circuit and the second switching node.

Aspect 17: The power supply circuit according to any of Aspects 11-16, wherein, when the power supply circuit is configured as the BoB converter, the power supply circuit further comprises an inductive element having a first terminal coupled to a first switching node between the first HS switch and the first LS switch and a second terminal coupled to a second switching node between the second HS switch and the second LS switch.

Aspect 18: The power supply circuit of Aspect 17, wherein, when the power supply circuit is configured as the BoB converter: the first HS switch is coupled between an input node of the power supply circuit and the first switching node; and the second HS switch is coupled between an output node of the power supply circuit and the second switching node.

Aspect 19: A method for voltage regulation via a power supply circuit, comprising: selecting, via a first multiplexer, one of a first feedback node and a second feedback node of the power supply circuit based on a voltage regulation configuration of the power supply circuit; coupling the one of the first feedback node and the second feedback node to a first feedback port of a control circuit; and controlling, via the control circuit, switches to generate one or more regulated voltages based on a feedback voltage at the one of the first feedback node and the second feedback node.

Aspect 20: The method of Aspect 19, wherein: the control circuit comprises a buck or boost (BoB) controller having a first set of control ports and a buck controller having a second set of control ports; and the method further comprises: selecting a first set of inputs of a second multiplexer or a second set of inputs of the second multiplexer, wherein the first set of inputs is coupled to the first set of control ports, and wherein the second set of inputs of the second multiplexer is coupled to the second set of control ports; and coupling the first set of inputs or the second set of inputs of the second multiplexer to a set of the switches of the power supply circuit, respectively, to generate the one or more regulated voltages.

Aspect 21: The method of Aspect 20, wherein the second feedback node is coupled to a feedback port of the buck controller.

Aspect 22: The method according to any of Aspects 19-21, wherein: the switches comprise a first high-side (HS) switch, a first low-side (LS) switch, a second HS switch, and a second LS switch; and when the voltage regulation configuration comprises a BoB configuration, generating the one or more regulated voltages comprises directing current across an inductive element having a first terminal coupled to a first switching node between the first HS switch and the first LS switch and a second terminal coupled to a second switching node between the second HS switch and the second LS switch.

Aspect 23: The method of Aspect 22, wherein, when the voltage regulation configuration comprises the BoB configuration: the first HS switch is coupled between an input node of the power supply circuit and the first switching node; and the second HS switch is coupled between the second switching node and an output node of the power supply circuit, the one or more regulated voltages comprising a regulated voltage at the output node.

Aspect 24: The method of Aspect 23, wherein, when the voltage regulation configuration comprises the BoB configuration, another one of the first feedback node and the second feedback node is coupled to a reference potential node.

Aspect 25: The method according to any of Aspects 19-24, wherein: the switches comprise a first high-side (HS) switch, a first low-side (LS) switch, a second HS switch, and a second LS switch; when the voltage regulation configuration comprises a dual-buck configuration, generating the one or more regulated voltages comprises: directing current across a first inductive element having a first terminal coupled to a first switching node between the first HS switch and the first LS switch and a second terminal coupled to a first output node of the power supply circuit, the one or more regulated voltages comprising a first regulated voltage at the first output node; and directing current across a second inductive element having a first terminal coupled to a second switching node between the second HS switch and the second LS switch and a second terminal coupled to a second output node of the power supply circuit, the one or more regulated voltages comprising a second regulated voltage at the second output node.

Aspect 26: The method of Aspect 25, wherein: the first output node is coupled to the first feedback node; and the second output node is coupled to the second feedback node.

Additional Considerations

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation, and details of the methods and apparatus described above without departing from the scope of the claims.

What is claimed is:

1. A power supply circuit, comprising:
a first high-side (HS) switch;
a first low-side (LS) switch;
a second HS switch;
a second LS switch;
a control circuit having control ports coupled to control inputs of the first HS switch, the first LS switch, the second HS switch, and the second LS switch; and
a first multiplexer having a first input coupled to a first feedback node of the power supply circuit and a second input coupled to a second feedback node of the power supply circuit, wherein an output of the first multiplexer is coupled to a first feedback port of the control circuit.

2. The power supply circuit of claim 1, wherein:
the control circuit comprises a buck or boost (BoB) controller having a first set of the control ports and a buck controller having a second set of the control ports; and
the power supply circuit further comprises a second multiplexer having a first set of inputs coupled to the first set of the control ports, a second set of inputs coupled to the second set of the control ports, and a set of outputs coupled to the control inputs of the second HS switch and the second LS switch.

3. The power supply circuit of claim 2, wherein the output of the first multiplexer is coupled to the first feedback port of the BoB controller.

4. The power supply circuit of claim 2, wherein the second feedback node is coupled to a second feedback port of the buck controller.

5. The power supply circuit of claim 1, further comprising an inductive element having a first terminal coupled to a first switching node between the first HS switch and the first LS switch and a second terminal coupled to a second switching node between the second HS switch and the second LS switch.

6. The power supply circuit of claim 5, wherein the power supply circuit is configured as a BoB converter, wherein the first HS switch is coupled between an input node of the BoB converter and the first switching node, and wherein the second HS switch is coupled between the second switching node and an output node of the BoB converter.

7. The power supply circuit of claim 6, wherein the output node is coupled to the second feedback node, and wherein the first feedback node is coupled to a reference potential node.

8. The power supply circuit of claim 1, further comprising:
a first inductive element having a first terminal coupled to a first switching node between the first HS switch and the first LS switch, and a second terminal coupled to a first output node of the power supply circuit; and
a second inductive element having a first terminal coupled to a second switching node between the second HS switch and the second LS switch, and a second terminal coupled to a second output node of the power supply circuit.

9. The power supply circuit of claim 8, wherein:
the first output node is coupled to the first feedback node; and
the second output node is coupled to the second feedback node.

10. The power supply circuit of claim 8, wherein the power supply circuit is configured with:
a first buck converter having the first inductive element, the first HS switch, and the first LS switch, wherein the first HS switch is coupled between an input node of the first buck converter and the first switching node; and
a second buck converter having the second inductive element, the second HS switch, and the second LS switch, wherein the second HS switch is coupled between an input node of the second buck converter and the second switching node.

11. A power supply circuit, comprising:
a first high-side (HS) switch;
a first low-side (LS) switch;
a second HS switch;
a second LS switch; and a control circuit coupled to control inputs of the first HS switch, the first LS switch, the second HS switch, and the second LS switch, wherein:

when the power supply circuit is configured as a dual-buck converter, the control circuit is configured to control the first HS switch and the first LS switch to generate a first buck voltage and control the second HS switch and the second LS switch to generate a second buck voltage; and when the power supply circuit is configured as a buck or boost (BoB) converter, the control circuit is configured to control the first HS switch, the first LS switch, the second HS switch, and the second LS switch to generate a BoB voltage.

12. The power supply circuit of claim 11, further comprising:

a first feedback node coupled to a first feedback port of the control circuit; and a second feedback node coupled to a second feedback port of the control circuit.

13. The power supply circuit of claim 12, wherein, when the power supply circuit is configured as the dual-buck converter, the first feedback node is coupled to a first output node of the power supply circuit configured to have the first buck voltage and the second feedback node is coupled to a second output node of the power supply circuit configured to have the second buck voltage.

14. The power supply circuit of claim 12, wherein, when the power supply circuit is configured as the BoB converter, the first feedback node is coupled to a reference potential node and the second feedback node is coupled to an output node of the power supply circuit configured to have the BoB voltage.

15. The power supply circuit of claim 11, wherein, when the power supply circuit is configured as the dual-buck converter, the power supply circuit further comprises:

a first inductive element having a first terminal coupled to a first switching node between the first HS switch and the first LS switch and a second terminal coupled to a first output node of the power supply circuit configured to have the first buck voltage; and a second inductive element having a first terminal coupled to a second switching node between the second HS switch and the second LS switch and a second terminal coupled to a second output node of the power supply circuit configured to have the second buck voltage.

16. The power supply circuit of claim 15, wherein, when the power supply circuit is configured as the dual-buck converter:

the first HS switch is coupled between a first input node of the power supply circuit and the first switching node; and the second HS switch is coupled between a second input node of the power supply circuit and the second switching node.

17. The power supply circuit of claim 11, wherein, when the power supply circuit is configured as the BoB converter, the power supply circuit further comprises an inductive element having a first terminal coupled to a first switching node between the first HS switch and the first LS switch and a second terminal coupled to a second switching node between the second HS switch and the second LS switch.

18. The power supply circuit of claim 17, wherein, when the power supply circuit is configured as the BoB converter:

the first HS switch is coupled between an input node of the power supply circuit and the first switching node; and the second HS switch is coupled between an output node of the power supply circuit and the second switching node.

19. A method for voltage regulation via a power supply circuit, comprising:

selecting, via a first multiplexer, one of a first feedback node and a second feedback node of the power supply circuit based on a voltage regulation configuration of the power supply circuit;

coupling the one of the first feedback node and the second feedback node to a first feedback port of a control circuit; and controlling, via the control circuit, switches to generate one or more regulated voltages based on a feedback voltage at the one of the first feedback node and the second feedback node.

20. The method of claim 19, wherein:

the control circuit comprises a buck or boost (BoB) controller having a first set of control ports and a buck controller having a second set of control ports; and the method further comprises:

selecting a first set of inputs of a second multiplexer or a second set of inputs of the second multiplexer, wherein the first set of inputs is coupled to the first set of control ports, and wherein the second set of inputs of the second multiplexer is coupled to the second set of control ports; and coupling the first set of inputs or the second set of inputs of the second multiplexer to a set of the switches of the power supply circuit, respectively, to generate the one or more regulated voltages.

21. The method of claim 20, wherein the second feedback node is coupled to a feedback port of the buck controller.

22. The method of claim 19, wherein:

the switches comprise a first high-side (HS) switch, a first low-side (LS) switch, a second HS switch, and a second LS switch; and when the voltage regulation configuration comprises a BoB configuration, generating the one or more regulated voltages comprises directing current across an inductive element having a first terminal coupled to a first switching node between the first HS switch and the first LS switch and a second terminal coupled to a second switching node between the second HS switch and the second LS switch.

23. The method of claim 22, wherein, when the voltage regulation configuration comprises the BoB configuration:

the first HS switch is coupled between an input node of the power supply circuit and the first switching node; and the second HS switch is coupled between the second switching node and an output node of the power supply circuit, the one or more regulated voltages comprising a regulated voltage at the output node.

24. The method of claim 23, wherein, when the voltage regulation configuration comprises the BoB configuration, another one of the first feedback node and the second feedback node is coupled to a reference potential node.

25. The method of claim 19, wherein:

the switches comprise a first high-side (HS) switch, a first low-side (LS) switch, a second HS switch, and a second LS switch;

when the voltage regulation configuration comprises a dual-buck configuration, generating the one or more regulated voltages comprises:

directing current across a first inductive element having a first terminal coupled to a first switching node between the first HS switch and the first LS switch and a second terminal coupled to a first output node of the power supply circuit, the one or more regulated voltages comprising a first regulated voltage at the first output node; and directing current across a second inductive element having a first terminal coupled to a second switching node between the second HS switch and the second LS switch and a second terminal coupled to a second output node of the power supply circuit, the one or more regulated voltages comprising a second regulated voltage at the second output node.

26. The method of claim 25, wherein:

the first output node is coupled to the first feedback node; and the second output node is coupled to the second feedback node.

* * * * *